United States Patent [19]

Quigley et al.

[11] Patent Number: 5,516,289

[45] Date of Patent: May 14, 1996

[54] ASTROLOGICAL COMPARISON WHEEL

[76] Inventors: Joan C. Quigley; Ruth H. Quigley, both of 1055 California St., San Francisco, Calif. 94108

[21] Appl. No.: 491,740

[22] Filed: Jun. 19, 1995

[51] Int. Cl.⁶ .................................................. G09B 29/00
[52] U.S. Cl. .......................................... 434/106; 273/161
[58] Field of Search ............................ 434/106; 273/161, 273/141 R

[56] References Cited

U.S. PATENT DOCUMENTS

| | | | |
|---|---|---|---|
| D. 262,954 | 2/1982 | Shores | D11/02 |
| D. 344,538 | 2/1994 | Hillen | D19/1 |
| 2,315,316 | 3/1943 | Cissna | 434/106 |
| 3,992,787 | 11/1976 | Lynch | 434/106 |
| 4,189,853 | 2/1980 | Provenzano | 35/44 |
| 4,193,213 | 3/1980 | Suda | 35/44 |
| 4,195,424 | 4/1980 | Heath | 35/44 |
| 4,304,554 | 12/1981 | Slayden | 434/106 |
| 4,306,141 | 12/1981 | Bailey et al. | 434/106 |
| 4,379,698 | 4/1983 | Boyd | 434/106 |
| 4,472,144 | 9/1984 | Mantley | 434/106 |
| 4,681,459 | 7/1987 | Nabeyama et al. | 368/16 |
| 4,711,632 | 12/1987 | Detrick | 434/106 |
| 4,778,186 | 10/1988 | Dudley | 273/243 |
| 4,779,870 | 10/1988 | Nichols | 273/161 |
| 5,118,110 | 6/1992 | Jones | 273/141 R |

*Primary Examiner*—Paul J. Hirsch
*Attorney, Agent, or Firm*—Feix & Feix

[57] ABSTRACT

An astrological comparison device for providing an astrological analysis of the relationship between two people based on the specific birth information of each person. The invention includes an assembly pair of rotatably interconnected wheels including a large diameter base wheel and a smaller diameter top wheel. Each wheel is divided into twelve equal segments which are individually provided with identical astrological indicia representing the ten planets of Sun, Moon, Mercury, Venus, Mars, Jupiter, Saturn, Uranus, Neptune and Pluto and the two angles of Midheaven and the Ascendant. In addition, for each wheel, indicia is provided to indicate the zodiac sign and/or house position and house rulerships of each of the ten planets as well as the zodiac sign of the Ascendant and Midheaven based on the birth information of each person. Each wheel refers to one person only. Code indicia is provided in the various segments of the base wheel. The code indicia contains information on all the planetary correspondences between the astrological charts of the first and second persons. A staggered array of windows is provided to the top wheel, one window per segment, such that the code indicia on the base wheel is selectively revealed in the windows as the two wheels are rotated with respect to one another.

26 Claims, 2 Drawing Sheets

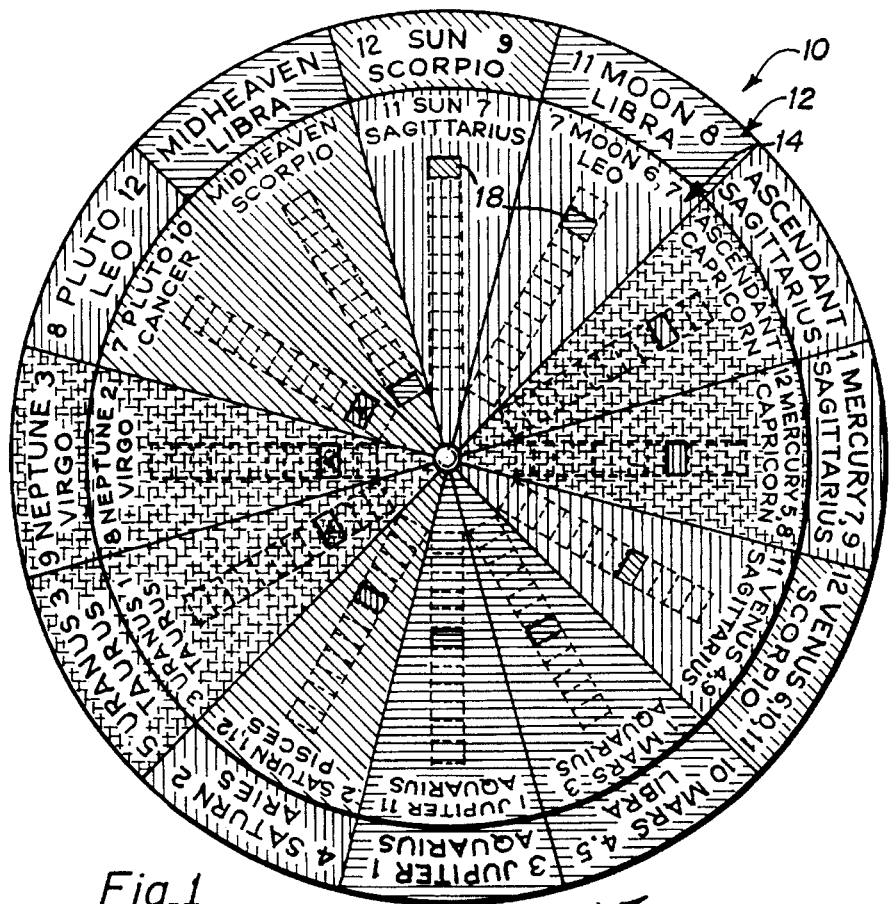
Fig_1
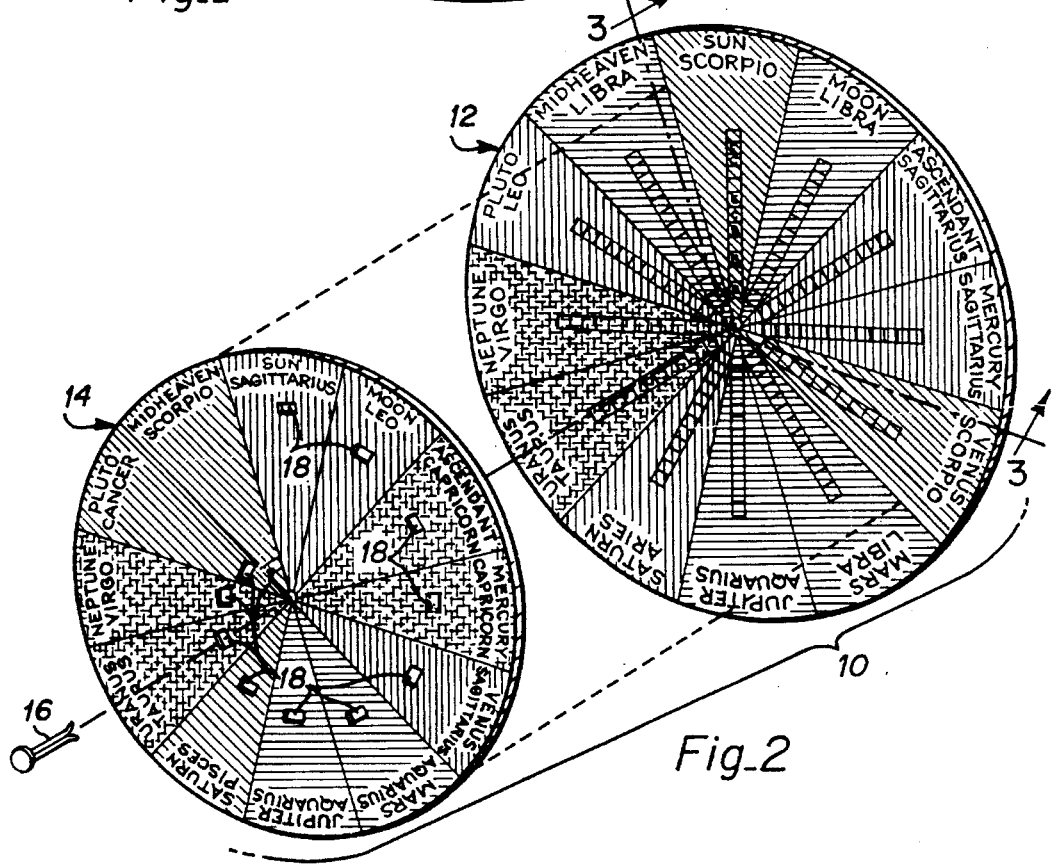
Fig_2

ASTROLOGICAL COMPARISON WHEEL

BACKGROUND OF THE INVENTION

1. Field of the Invention

The present invention relates generally to astrological forecasting apparatus. More particularly, the invention relates to a comparison wheel assembly which is designed to provide an accurate comparison of any two astrological charts. The example shown herein is for an analysis of the relationship between two people based on the specific birth information of each individual.

2. Brief Description of the Prior Art

The philosophy of astrology involves forecasting the future by studying the influence of the relative positions of the planets on human affairs. Professional astrologers are often consulted by those who are interested in getting an accurate astrological analysis of their compatibility with another person, such as for example, a potential mate. Unfortunately, not everybody has access to an astrologer.

There are many books on astrology as well as other self help aids which are available to the lay person to assist them in analyzing their potential compatibility with another person. However, performing an accurate astrological analysis using such self help materials is time consuming and is beyond the skill and patience of most people.

Astrology forecasting devices in the form of concentric wheels having astrological indicia thereon for assisting the user in astrological evaluations are known from the prior art. Exemplary wheel-type astrology forecasting devices are disclosed in U.S. Pat. No. 4,189,853 to Provenzano and U.S. Pat. No. 4,379,698 to Boyd.

A common drawback of such prior art wheel-type astrology forecasting devices is that they are capable of providing only a very limited and general astrological analysis of the compatibility/incompatibility between two users of the device. This limited forecasting capability of the prior art devices stems from the fact that they are only concerned with Sun Sign comparisons in order to make the devices "all purpose" so that they can be used to make an astrological comparison between any two users of the device based on the birth dates of the respective users.

Astrological forecasting which is based only on the knowledge of a person's date of birth is commonly referred to as "Sun Sign astrology". Sun Sign astrology is the least exact and most superficial form of astrology.

To appreciate this fact, the following discussion on Sun Sign astrology is helpful. The Sun is the center of our planetary system, and it is one of the most important features in a person's horoscope. The Sun is in approximately the same position on the same day every year. For instance, if person A was born June 1, 1940, and person B was born June 1, 1934, and person C was born June 1, 1901, they would all be Geminis because Gemini is the sign of the Sun between May 21 and June 21 of any year.

But all people born between May 21 and June 21 are not alike. This is because the other planets must also be taken into consideration. The other planets do not move regularly like the Sun but can be in different signs on the same day in different years. A person might, for example, have his Sun in one sign and his Venus in another sign. Venus is the planet that has to do with a person's love nature. Two people born under the same Sun sign can, for instance, have very different love natures depending on the sign in which their respective Venuses are located.

Take, for example, person A born June 1, 1940. While person A's Sun is in the versatile and intellectual sign of Gemini, person A's Venus is in Cancer which would at the same time make person A very sentimental and emotional in any romantic relationship. Person C born June 1, 1901, is another Gemini, but person C's Venus is also in Gemini, which would make person C somewhat fickle and a great flirt. Person C would have an intellectual rather than an emotional approach to the opposite sex. Different still would be person B born June 1, 1934. Although person B is a Gemini too, Venus in Aries would make person B very fiery, headstrong and independent in love. So it is easy to see how different persons A, B and C will be in a romantic relationship even though they all have the same Sun sign and their birthdays are on the same day.

But what about people born on the same day and year? Even they are not necessarily alike. Astrology has an explanation for this, too. It is because the time of day and the place of birth can make such a difference in an astrological chart, especially the Ascendant and the Moon. The Ascendant goes through every sign of the Zodiac in the course of a single day, and on many days the Moon may be in either one of two signs. This explains why people born on the same day and year but at different times of day can be very dissimilar because the Moon and/or the Ascendant have changed signs.

Accordingly, in order to get a more accurate and meaningful analysis of the astrological correspondences between two people, it is necessary to also know the sign and house position of the other planets (i.e., the Moon, Mars, Venus, etc.) for each person so that all the planetary correspondences between two people can be determined. This information can not be obtained using Sun Sign astrology alone since information on the two people's time and place of birth is also needed to make an accurate astrological analysis.

U.S. Pat. No. 4,711,632 to Detrick discloses another version of a generic or general use wheel-type device based on Sun Sign astrology. Detrick acknowledges the limited general forecast capability of his device and further notes that a more refined astrological forecast on the compatibility/incompatibility of two people can be obtained by referring to a computer print out (from a commercially available astrological program) which will provide information on the position of the planets relative to the twelve zodiac signs.

It would be well if such planetary position information were already contained on a single astrological wheel-type comparison device such that the user would not be required to look to other outside sources such as computer print outs, charts, etc. in order to get a more accurate astrological analysis.

SUMMARY OF THE INVENTION

It is among the objects of the present invention to provide a wheel-type apparatus that delivers astrological information in a user-friendly visual format allowing an accurate comparison of the relationship between two astrological charts, whether it be a comparison of the relationship between two individuals based on the specific birth information of each person or a comparison of the progressed charts of two individuals or a comparison between the natal and progressed charts of one individual or a comparison between the natal and transit charts of one individual.

Briefly, a preferred embodiment of the present invention comprises an assembly pair of rotatable interconnected disks or wheels including a large diameter base wheel and a smaller diameter top wheel. Each wheel is divided into twelve equal segments. The twelve segments are individually provided with identical astrological indicia each representing one of the ten planets of Sun, Moon, Mercury, Venus, Mars, Jupiter, Saturn, Uranus, Neptune and Pluto and the two angles of Midheaven and the Ascendant. In addition, for each wheel, zodiac sign and/or house indicia are provided for each of the planets based on the birth information for each person, one person per wheel. In other words, the indicia provided on the base wheel indicates the zodiac sign and/or house position and rulership(s) of the planets for the first person and the indicia provided on the top wheel indicates the zodiac sign and/or house position and rulership(s) of the planets for the second person. Code indicia is provided in the various segments of the base wheel. The code indicia refers to supplementary written materials which provide information on correspondences for each planet-to-planet relationship. A staggered array of windows are provided to the top wheel, one window per segment, such that the individual code indicium on the base wheel is selectively revealed in the windows as the two wheels are rotated with respect to one another.

The astrological comparison wheel of the present invention advantageously provides information about all the correspondences of the planets of one person's horoscope with the planets of another person's horoscope and thus provides a detailed and accurate astrological analysis of the compatibility between two individuals.

These and other objects and advantages of the present invention will no doubt become apparent to those skilled in the art from the following drawings, detailed description of the preferred embodiment and the appended claims.

IN THE DRAWING

FIG. 1 is an elevational view of the astrological comparison wheel assembly of the present invention.

FIG. 2 is an exploded isometric view of the astrological comparison wheel assembly of FIG. 1.

DESCRIPTION OF THE PREFERRED EMBODIMENT

Figure 3:
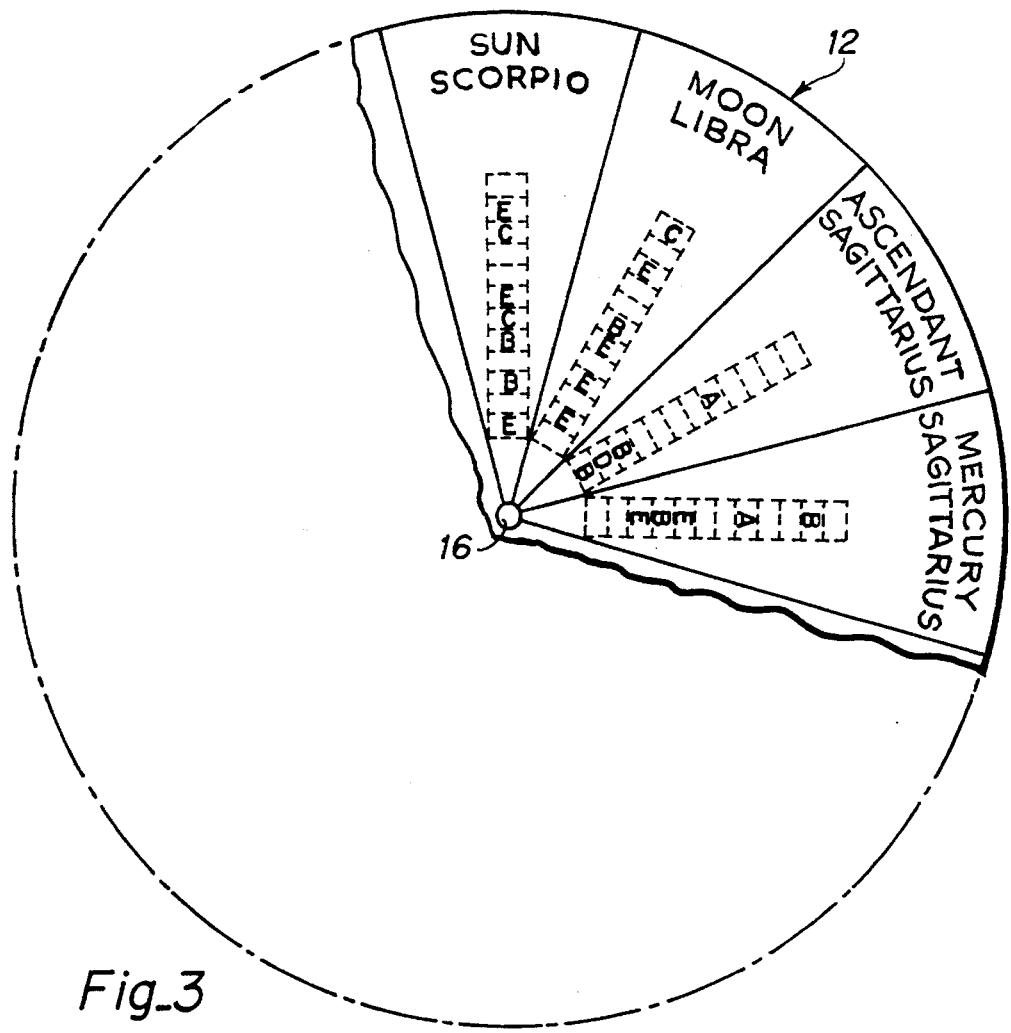
FIG. 3 is an enlarged fragmentary view of a portion of the base wheel taken along the line and in the direction of arrow 3—3 of FIG. 2.

This description will clearly enable one skilled in the art to make and use the invention, and describes several embodiments, adaptations, variations, alternatives and uses of the invention, including what we presently believe is the best mode of carrying out the invention.

An astrological comparison device constructed in accordance with one embodiment of the present invention is indicated generally by the reference numeral 10 in FIGS. 1–2.

The astrological comparison device 10 defines an assembly of two disks or wheels including a base wheel 12 and a top wheel 14. In use, the wheels 12 and 14 are arranged concentrically in descending order of size and are joined together by central pivot pin 16 such that they are able to rotate independently of one another about a common center axis.

Both wheels 12 and 14 bear markings indicative of the astrological chart information for two people based on the time, date and place of birth of each person and the top wheel 14 is of a smaller diameter to expose an outer perimeter portion of the base wheel 12.

In practice, the base wheel 12 will be provided with markings or astrological indicia associated with a first person and and the top wheel 14 will be provided with markings or astrological indicia associated with a second person.

Each wheel 12 and 14 is divided into twelve equal segments and the outer perimeter portion of these twelve segments are provided with markings or indicia which identify the 10 planets used in astrology (i.e., Sun, Moon, Mercury, Venus, Mars, Jupiter, Saturn, Uranus, Neptune, and Pluto) and the two angles of Ascendant and Midheaven. Thus, for example, as is seen in the drawings, the arrangement of the segments of each wheel is as follows (in the clockwise direction beginning with the SUN segment):

SUN, MOON, ASCENDANT,
MERCURY, VENUS, MARS,
JUPITER, SATURN, URANUS,
NEPTUNE, PLUTO, and MIDHEAVEN.

The outer perimeter portion of each wheel 12 and 14 also includes zodiac indicia, selectively placed adjacent the planet/angle markings in each segment to indicate the sign/ and or house position for each planet of the two persons being compared. The sign refers to the sign of the Zodiac in which a particular planet or angle is to be found for a specific individual based on that person's birth information. Also, for each segment containing a planet marking, numerical indicium to the left and right of the planet marking is optionally provided. The numerical indicium to the left of each planet marking refers to the house position of that planet while the numerical indicium to the right of each planet marking refers to the house/s ruled by that planet. House placement refers to the house in which a particular planet is to be found for a particular person based on that person's birth information. It should be noted that the numerical indicium indicating the house position and house rulership for each planet is not shown in FIGS. 2 and 3 for purposes of clarity.

In the situation where a planet rules more than one house, two (or more) numerical indicium is/are present. For example, in the case of the Moon segment in top wheel 14, the numbers 6 and 7 are present thus indicating that the Moon rules both the sixth and seventh houses.

Each sign has a particular element (i.e. the elements of earth, air, water and fire) associated therewith. There are three signs which are defined by a particular element. The correspondence between the signs and their associated elements is referred to as the triplicities.

In accordance with the invention, the twelve segments of each wheel 12 and 14 are further organized into four groups to identify the triplicities for the twelve signs of the zodiac. In the preferred embodiment, the identification of the triplicities for the twelve houses is done in accordance with the following color scheme:

| RED | YELLOW | BLUE | GREEN |
| --- | --- | --- | --- |
| Aries | Taurus | Gemini | Cancer |
| Leo | Virgo | Libra | Scorpio |
| Sagittarius | Capricorn | Aquarius | Pisces |

The drawings are lined to indicate the above four colors. It is understood that the triplicities may be identified into their four respective groups by other means such as through the use of symbols or different textures or even braille markings for the sight impaired.

The top wheel 14 includes a plurality of windows 18, one window per each of the twelve segments. The windows 18 are preferably arranged in a spiralling descending pattern with the highest placed window located in the SUN segment, the next highest window located in the MOON segment and continuing in such fashion with the lowest placed window located in the MIDHEAVEN segment.

Each of the segments of the base wheel 12 is provided with code indicia that lies under the top wheel. The code indicia are arranged in radial columns and aligned coordinate with the locations of the windows 18 in the segments of the top wheel 14 such that each of the individual code indicium is selectively revealed in certain ones of the windows 18 as the top wheel 14 is rotated for sequential alignment with the various segments of the base wheel 12. The code indicia as shown includes the letters A, B, C, D, and E, but it is understood that additional and/or other types of indicia may be used as well.

As is best seen in FIG. 3, the code indicia is preferably ordered into radial columns, one column per segment, with twelve positions for each column. The code indicia represents the astrological correspondences between the planets and angles (i.e., the twelve segments on each wheel) of the two people whose astrological charts are being compared. The astrological correspondences may describe, for example, the aspects or configurations between the astrological charts of the two people being compared. An aspect or configuration is defined as the number of degrees between two planets that define a given correspondence.

To interpret a particular code indicium or letter that is revealed in a window when a planet segment on one wheel is aligned with a planet segment on the other wheel, the users are referred to supplementary written materials which provide a brief description of each of the possible correspondences (each correspondence being associated with a particular code letter) for each comparison between the respective planet or angle segments of the two wheels. The particular ordering of the code indicia into their respective columns provided on each of the twelve segments of the bottom wheel 12 is in accordance with a computer print out which will vary in signs, degrees and planets depending on the time, date and place of birth information of each user. Computer programs for generating such correspondence information are well known and commercially available but are complex and unwieldy to use by the inexperienced.

The supplementary written materials provided with the astrological comparison wheel assembly of the present invention will preferably include a booklet which contains sections on "How the Signs Relate" and "How the Planets Relate". These sections will describe the correspondences identified by the code indicia revealed in the window as well as certain other color and sign relationships. A numerical scoring system assigning point values to the correspondences between the partners' planets may optionally be provided allowing the partners to rate their relationship according to various categories.

The use of the above code indicia scheme on the base wheel 12 of the present invention advantageously presents this computer print out information directly on to the base wheel 12 in an easy to interpret code format and therefore provides a simple way to evaluate with great accuracy the astrological correspondences between two people's horoscope in a user friendly way.

The correspondences between the planets of one person's horoscope and the planets of another person's horoscope are determined by the number of degrees between the planets being compared are found.

In the example shown, the five letter code indica (A,B, C,D and E) define the five classical configuration correspondences, namely: conjuncts, sextiles, squares, trines and oppositions. Additional code indicia, for example, five code letters F, G, H, I and J (not shown), may be used to indicate the five configuration correspondences of semisextile, semisquare, sesquisquare, quincunx and parallels.

The astrological comparison apparatus of the present invention is designed to provide an accurate astrological analysis of the compatibility between two people based on the time, date and place of birth of each person or just the birth date of each person.

A specific application of the present invention is for providing a comparison of the charts of two partners in order to determine their compatibility for romance and marriage. Other exemplary types of comparisons may be done to determine compatibility in the following types of relationships: parent/child, teacher/child, employer/employee, friend/friend, doctor/patient, surgeon/patient, lawyer/client, business partnerships, agent/client, owner/pet, etc. Comparisons may also be done on the basis of horoscopes such as comparisons between a progressed horoscope to a natal horoscope, a transit horoscope to a natal horoscope and a progressed horoscope to a progressed horoscope.

EXAMPLE

The following specific example comparison describes the operation of the astrological comparison wheel assembly 10 of the present invention.

For purposes of illustration, suppose two people, John and Jane, were interested in learning about their compatibility for romance and marriage.

The birth information for John and Jane is listed below:

| | |
|---|---|
| John | Born November 19, 1938 at 8:50 AM, Cincinnati, Ohio |
| Jane | Born December 21, 1937 at 9:14 AM New York, New York |

For the sake of clarity, assume that the John's birth information is described by the base wheel 12 and the Jane's birth information is described by the top wheel 14. Thus, the sign in which each planet or angle is found for John is as shown on base wheel 12 and the sign in which each planet or angle is found for Jane is as shown on the top wheel 14. Further, the code indicia A, B, C, D, and E representing the five classical correspondences is arranged in the respective radial columns provided in each of the twelve segments of the base wheel 12 such that an individual code indicium or letter will be revealed in a window when a particular correspondence exists for a particular planet comparison between the horoscopes of John and Jane.

The first astrological comparison of interest is the SUN/SUN comparison. To perform the SUN/SUN comparison, the wheels 12 and 14 are rotated with respect to each other so that the SUN segment of the smaller diameter top wheel 14 is aligned with the SUN segment of the larger diameter base wheel 12.

In this example, there is no A, B, C, D or E correspondence between the respective SUN segments of the two wheels so nothing appears in the SUN window (i.e. the window located in the SUN segment of the top wheel 14). The users will then be referred to the supplementary written materials for information on how their SUN signs relate. As Jane's Sun is in Sagittarius (Jane being represented by top wheel 14) and John's Sun is in Scorpio (John being represented by base wheel 12), they will read a description on Scorpio-Sagittarius.

Next, the top wheel 14 is rotated to align the SUN segment of the top wheel 14 with the MOON segment of the base wheel 12 whereby a C appears in the window. The partners then read the SUN/MOON description for a C correspondence in the supplementary written materials to learn how these planets relate to each other. As noted above, a numerical scoring system may optionally be used in conjunction with the written descriptions of the correspondences. If such a system is provided, a numerical value may be assigned to a SUN/MOON C correspondence and the partners would enter the numerical value on a scoring sheet which would be provided.

The top wheel 14 is rotated again to align the SUN segment of the top wheel 14 with the ASCENDANT segment of the base wheel 12. In the example given, there is no letter correspondence shown through the window. However, the color red shows through the window, so that John's ASCENDANT has the same color identifier as Jane's SUN. Accordingly, there will be a description when the same color (or like identifier means) shows in the window, and if a numerical scoring system is used, points will be given for same color (or identifier) correspondences. In this example, Jane's SUN in Sagittarius is in the same sign as John's ASCENDANT, so that there is a stronger correspondence than just a same color correspondence. If a numerical scoring system is used, a greater number of points will be given when the sign as well as the color is the same.

As the SUN segment of the top wheel 14 is turned to each consecutive planetary/angle segment of the base wheel 12, the code indicium or letter appearing in the respective windows will describe the astrological correspondences that exist between the Sun of the first partner or user (Jane) and all of the planets, Ascendant and Midheaven of the second partner or user (John). Where no letter appears in a window, no correspondence exists for that planet-to-planet comparison. Accordingly, by turning the top wheel 14, the partners discover that in addition to the correspondences already found, the first partner's Sun has the following correspondences with the second partner:

SUN/MERCURY A
SUN/JUPITER C
SUN/NEPTUNE E
SUN/MIDHEAVEN E

Thus, the partners would read the relevant sections in the supplementary written materials and score those correspondences. As may be shown by the scoring system, certain correspondences would receive minus points to indicate areas of low or poor compatibility.

The partners are then ready to discover the correspondences between the first partner's Moon and the second partner's planets, Ascendant and Midheaven. Beginning with the alignment of the MOON segment of the top wheel 14 with the SUN segment of the base wheel 12, an E correspondence appears in the window. The partners would then refer to the supplementary written materials for a description of the SUN/MOON E correspondence and enter the corresponding assigned point value on the scoring sheet. It is interesting to note in this example that the first partner's Sun has a C correspondence with the second partner's Moon while the second partner's Sun has an E correspondence with first partner's Moon. As the partners continue to turn the top wheel 14 to align the top wheel MOON segment to each of the remaining eleven segments of the base wheel 12, the following correspondences between the first partner's Moon and the second partner's planets are revealed:

MOON/MOON C
MOON/ASCENDANT B
MOON/MERCURY B
MOON/VENUS E
MOON/MARS C
MOON/JUPITER D
MOON/URANUS E

The partners would then read and score the foregoing planetary correspondences in accordance with the point values assigned in the supplementary written materials.

Next, the ASCENDANT segment of the top wheel 14 is aligned with the SUN segment of the base wheel 12 and a C appears in the window. The point value corresponding to the SUN/ASCENDANT description as set forth in the supplementary materials is entered on the scoring sheet. The top wheel 14 is then turned so that the ASCENDANT segment of the top wheel 14 is separately aligned with the other eleven segments of the base wheel 12 whereby the following correspondences are revealed:

ASCENDANT/MOON E
ASCENDANT/VENUS C
ASCENDANT/NEPTUNE B
ASCENDANT/PLUTO D
ASCENDANT/MIDHEAVEN B

The partners would read and score the Ascendant descriptions given for each of the foregoing correspondences for the planets cited.

The partners follow the same procedure for the first partner's Mercury, Venus, Mars, Jupiter, Saturn, Uranus, Neptune, Pluto and Midheaven, always starting with the first partner's planet aligned with the SUN segment of the base wheel 12 and then separately aligning the particular planet segment of the first partner's top wheel 14 to each of the other eleven segments of the base wheel 12 and reading off the correspondences which appear as code indicia in the associated windows.

Accordingly, for the example given, the partners will read and score the following descriptions.

For Mercury:
MERCURY/MARS E
MERCURY/SATURN E
MERCURY/URANUS B
MERCURY/NEPTUNE B

For Venus:
VENUS/ASCENDANT A
VENUS/MERCURY A
VENUS/MARS C
VENUS/JUPITER C
VENUS/NEPTUNE E For Mars:
MARS/SUN E
MARS/MOON B
MARS/VENUS E
MARS/JUPITER A For Jupiter:
JUPITER/SUN C
JUPITER/MOON E
JUPITER/VENUS C
JUPITER/PLUTO D
JUPITER/MIDHEAVEN B For Saturn:
SATURN/SUN B
SATURN/VENUS B
SATURN/NEPTUNE D
SATURN/PLUTO B
SATURN/MIDHEAVEN D
For Uranus:
URANUS/URANUS A
For Neptune:
NEPTUNE/SUN C
NEPTUNE/MERCURY E
NEPTUNE/VENUS C
NEPTUNE/URANUS B
NEPTUNE/NEPTUNE A
For Pluto:
PLUTO/SUN B
PLUTO/MOON E
PLUTO/VENUS B
PLUTO/NEPTUNE C
PLUTO/PLUTO A
PLUTO/MIDHEAVEN C
For Midheaven:
MIDHEAVEN/SUN A
MIDHEAVEN/VENUS A
MIDHEAVEN/JUPITER E
MIDHEAVEN/URANUS D
MIDHEAVEN/NEPTUNE C Thus, as is apparent from the foregoing description, the sequential alignment of each of the planetary segments of the top wheel 14 with the twelve planetary segments of the base wheel 12 will reveal, in the respective windows, all of the correspondences between the first partner's planets, Ascendant and Midheaven and each of the second partner's planets, Ascendant and Midheaven.

In accordance with an advantageous aspect of the invention, the smaller diameter top wheel 14 only contains astrological information (i.e. the planetary and angular indicia and sign and house indicia) particular to one user or partner thus making the top wheel 14 reusable for comparisons with more than one larger diameter base wheel 12. The base wheel 12, on the other hand, is only usable with one top wheel associated with a particular user or partner as the base wheel contains not only the astrological information particular to the second user or partner but also contains the code indicia which describes the astrological correspondences between two particular partners based on their respective birth information.

ALTERNATE EMBODIMENTS

Figure 4:
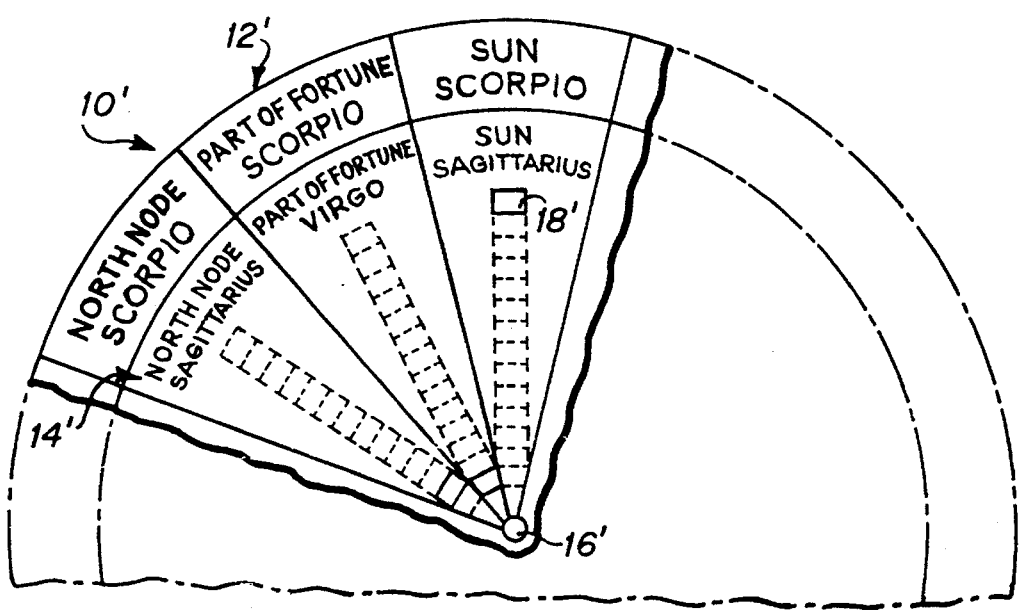
FIG. 4 is an enlarged fragmentary elevational view of an alternate embodiment of the present invention.

In the event that either one or both of the users or partners does/do not know their exact or approximate time of birth, the ASCENDANT and MIDHEAVEN segments on that person's or persons' respective wheels will be left blank. That is, the angle segments for any user not knowing their time of birth will not be assigned any sign or color indicia as this information is not possible to calculate without knowledge of exact or approximate time of birth. In addition, the MOON segment may optionally have one color designation and one sign as in the preferred embodiment described above or may be further divided into two differently colored subsegments with each subsegment being provided with its own astrological sign, depending on the position of the Moon on the date of birth for the user or users who do not know their time of birth FIG. 4 is an enlarged elevational view of a second alternate embodiment of the invention showing a quarter section of the astrological comparison device 10' taken from about the nine o'clock position to the twelve o'clock position. Elements of the second alternate embodiment which are common to the preferred embodiment are designated by a prime indicator following the associated reference numeral.

The astrological comparison device 10' of the second alternate embodiment includes two additional segments labeled as NORTH NODE and PART OF FORTUNE for a total of fourteen segments on each of the base and top wheels 12', and 14'. The zodiac indicia indicating the sign and/or house position for the two additional segments is also provided on the segment as before. Windows 18' are also provided as before in order to reveal code indicia which correspond to the astrological correspondences of interest between the two charts being compared.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

What is claimed is:

1. A comparison wheel apparatus for comparing the astrological charts of two people and for providing an astrological analysis of the relationship between the two people based on the birth information of each person, comprising:

a) a base wheel having a first diameter and a center;

b) a top wheel having a second diameter and a center, said second diameter of said top wheel being smaller than said first diameter of said base wheel;

c) said top wheel overlying said base wheel and is pivotally attached thereto along their respective centers such that an outer peripheral portion of said base wheel extends beyond an outer periphery of said top wheel;

d) each of said base wheel and said top wheel being divided into twelve equal segments, said twelve segments having planetary and angular indicia means printed thereon, said planetary and angular indicia means for representing the ten planets of Sun, Moon, Mercury, Venus, Mars, Jupiter, Saturn, Uranus, Neptune, and Pluto and the two angles of Ascendent and Midheaven;

e) said base wheel further including zodiac indicia disposed adjacent a respective one of said planetary and angular indica means of said twelve segments in accordance with birth information of a first person;

f) said top wheel further including zodiac indicia disposed adjacent a respective one of said planetary and angular indica means in each of said twelve segments in accordance with birth information of a second person;

g) said base wheel including code indicia containing information on the astrological correspondences between the first and second persons; and h) said top wheel including window means disposed in each of said twelve segments, said window means being oriented with respect to said code indicia on said base wheel to reveal particular ones of the code indicia as said top wheel is rotated with respect to said base wheel, and wherein the particular ones of the code indicia that are revealed indicate planetary correspondences of interest between the first and second persons.

2. The invention according to claim 1 wherein:
   a) said zodiac indicia represents signs associated with each planetary and angular indicium; and
   b) identifier means are provided for identifying the respective triplicities associated with the twelve signs.

3. The invention according to claim 2 wherein the identifier means comprises a four color code scheme.

4. The invention according to claim 1 which includes a supplementary guide containing written descriptions which explain the significance of each of the astrological correspondence associated with each planetary relationship.

5. The invention according to claim 1 wherein the birth information includes the time, date and place of birth.

6. The invention according to claim 2 wherein each of said segments having planetary indicium provided thereon further includes numerical indicia indicating house position and house rulerships for each respective planet.

7. The invention according to claim 1 wherein the birth information includes the date of birth.

8. The invention according to claim 1 wherein each of said base and top wheels further include two additional segments each having indicia means for representing Noah Node and Part of Fortune, respectively.

9. An astrological comparison wheel apparatus for comparing a natal and progressed chart of an individual, said astrological comparison wheel apparatus comprises:
   a) a base wheel having a first diameter and a center;
   b) a top wheel having a second diameter and a center, said second diameter of said top wheel being smaller than said first diameter of said base wheel;
   c) said top wheel overlying said base wheel and is pivotally attached thereto along their respective centers such that an outer peripheral portion of said base wheel extends beyond an outer periphery of said top wheel;
   d) each of said base wheel and said top wheel being divided into twelve equal segments, said twelve segments having planetary and angular indicia means printed thereon, said planetary and angular indicia means for representing the ten planets of Sun, Moon, Mercury, Venus, Mars, Jupiter, Saturn, Uranus, Neptune, and Pluto and the two angles of Ascendent and Midheaven;
   e) said base wheel further including zodiac indicia disposed adjacent a respective one of said planetary and angular indica means of said twelve segments should be in accordance with information from a progressed chart of an individual user;
   f) said top wheel further including zodiac indicia disposed adjacent a respective one of said planetary and angular indica means in each of said twelve segments in accordance with information from a natal chart of said individual user;
   g) said base wheel including code indicia containing information on the astrological correspondences between the natal and progressed charts; and
   h) said top wheel including window means disposed in each of said twelve segments, said window means being oriented with respect to said code indicia on said base wheel to reveal particular ones of the code indicia as said top wheel is rotated with respect to said base wheel, and wherein the particular ones of the code indicia that are revealed indicate planetary correspondences of interest between the natal and progressed charts of the individual user.

10. The invention according to claim 9 wherein:
    a) said zodiac indicia represents signs associated with each planetary and angular indicium; and
    b) identifier means are provided for identifying the respective triplicities associated with the twelve signs.

11. The invention according to claim 10 wherein the identifier means comprises a four color code scheme.

12. The invention according to claim 9 which includes a supplementary guide containing written descriptions which explain the significance of each of the astrological correspondence associated with each planetary relationship.

13. The invention according to claim 10 wherein each of said segments having planetary indicium provided thereon further includes numerical indicia indicating house position and house rulerships for each respective planet.

14. The invention according to claim 9 wherein each of said base and top wheels further include two additional segments each having indicia means for representing Noah Node and Part of Fortune, respectively.

15. An astrological comparison wheel apparatus for comparing a natal and transit charts of an individual, said astrological comparison wheel apparatus comprises:
    a) a base wheel having a first diameter and a center;
    b) a top wheel having a second diameter and a center, said second diameter of said top wheel being smaller than said first diameter of said base wheel;
    c) said top wheel overlying said base wheel and is pivotally attached thereto along their respective centers such that an outer peripheral portion of said base wheel extends beyond an outer periphery of said top wheel;
    d) each of said base wheel and said top wheel being divided into twelve equal segments, said twelve segments having planetary and angular indicia means printed thereon, said planetary and angular indicia means for representing the ten planets of Sun, Moon, Mercury, Venus, Mars, Jupiter, Saturn, Uranus, Neptune, and Pluto and the two angles of Ascendent and Midheaven;
    e) said base wheel further including zodiac indicia disposed adjacent a respective one of said planetary and angular indica means of said twelve segments in accordance with information from a transit chart of an individual user;
    f) said top wheel further including zodiac indicia disposed adjacent a respective one of said planetary and angular indica means in each of said twelve segments in accordance with information from a natal chart of said individual user;
    g) said base wheel including code indicia containing information on the astrological correspondences between the natal and transit charts; and
    h) said top wheel including window means disposed in each of said twelve segments, said window means being oriented with respect to said code indicia on said base wheel to reveal particular ones of the code indicia as said top wheel is rotated with respect to said base wheel, and wherein the particular ones of the code indicia that are revealed indicate planetary correspondences of interest between the natal and transit charts of the individual user.

16. The invention according to claim 15 wherein:
    a) said zodiac indicia represents signs associated with each planetary and angular indicium; and b) identifier means are provided for identifying the respective triplicities associated with the twelve signs.

17. The invention according to claim 16 wherein the identifier means comprises a four color code scheme.

18. The invention according to claim 15 which includes a supplementary guide containing written descriptions which explain the significance of each of the astrological correspondences associated with each planetary relationship.

19. The invention according to claim 16 wherein each of said segments having planetary indicium provided thereon further includes numerical indicia indicating house position and house rulerships for each respective planet.

20. The invention according to claim 15 wherein each of said base and top wheels further include two additional segments each having indicia means for representing North Node and Part of Fortune, respectively.

21. An astrological comparison wheel apparatus for comparing the progressed charts of any two individuals, said astrological comparison wheel apparatus comprises:

a) a base wheel having a first diameter and a center;

b) a top wheel having a second diameter and a center, said second diameter of said top wheel being smaller than said first diameter of said base wheel;

c) said top wheel overlying said base wheel and is pivotally attached thereto along their respective centers such that an outer peripheral portion of said base wheel extends beyond an outer periphery of said top wheel;

d) each of said base wheel and said top wheel being divided into twelve equal segments, said twelve segments having planetary and angular indicia means printed thereon, said planetary and angular indicia means for representing the ten planets of Sun, Moon, Mercury, Venus, Mars, Jupiter, Saturn, Uranus, Neptune, and Pluto and the two angles of Ascendent and Midheaven;

e) said base wheel further including zodiac indicia disposed adjacent a respective one of said planetary and angular indica means of said twelve segments in accordance with information from a progressed chart of a first user;

f) said top wheel further including zodiac indicia disposed adjacent a respective one of said planetary and angular indica means in each of said twelve segments in accordance with information from a progressed chart of a second user;

g) said base wheel including code indicia containing information on the astrological correspondences between the progressed charts of the first and second users, and h) said top wheel including window means disposed in each of said twelve segments, said window means being oriented with respect to said code indicia on said base wheel to reveal particular ones of the code indicia as said top wheel is rotated with respect to said base wheel, and wherein the particular ones of the code indicia that are revealed indicate planetary correspondences of interest between the progressed charts of the first and second users.

22. The invention according to claim 21 wherein:

a) said zodiac indicia represents signs associated with each planetary and angular indicium; and b) identifier means are provided for identifying the respective triplicities associated with the twelve signs.

23. The invention according to claim 22 wherein the identifier means comprises a four color code scheme.

24. The invention according to claim 21 which includes a supplementary guide containing written descriptions which explain the significance of each of the astrological correspondences associated with each planetary relationship.

25. The invention according to claim 22 wherein each of said segments having planetary indicium provided thereon further includes numerical indicia indicating house position and house rulership for each respective planet.

26. The invention according to claim 21 wherein each of said base and top wheels further include two additional segments each having indicia means for representing North Node and Part of Fortune, respectively.

* * * * *

UNITED STATES PATENT AND TRADEMARK OFFICE
CERTIFICATE OF CORRECTION

PATENT NO. : 5,516,289
DATED : May 14, 1996
INVENTOR(S) : Joan C. Quigley; Ruth H. Quigley It is certified that error appears in the above-identified patent and that said Letters Patent is hereby corrected as shown below:

In column 11, line 26, correct "Noah Node" to read -- North Node --.

In column 12, line 20-21, correct "Noah Node" to read -- North Node --.

Signed and Sealed this

Twelfth Day of May, 1998

Attest:

BRUCE LEHMAN

*Attesting Officer*     *Commissioner of Patents and Trademarks*